O. SCHMIDT.
WEIGHING SCALE.
APPLICATION FILED AUG. 17, 1921.
1,419,766.
Patented June 13, 1922.
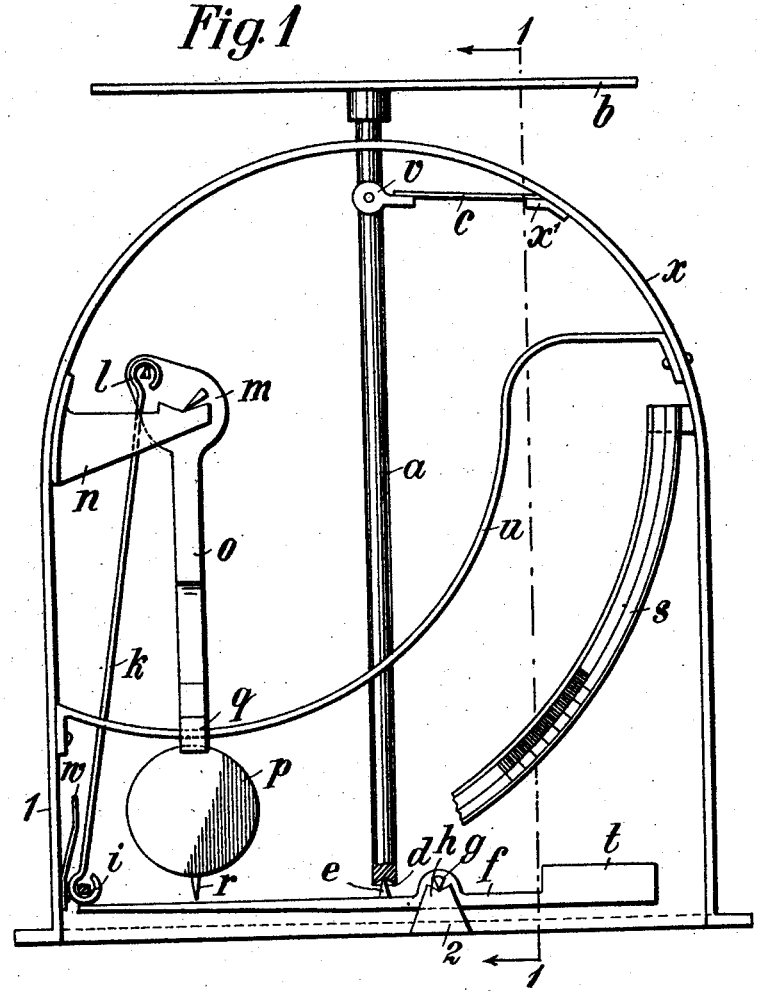
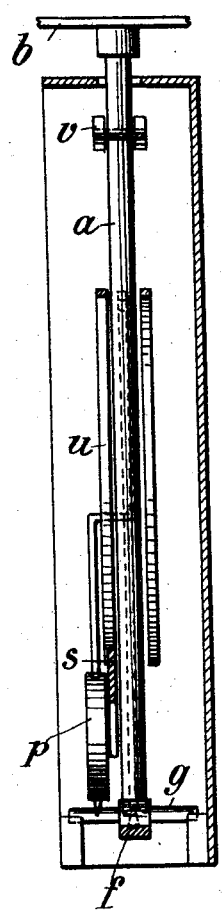
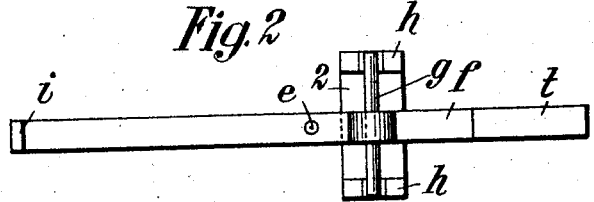
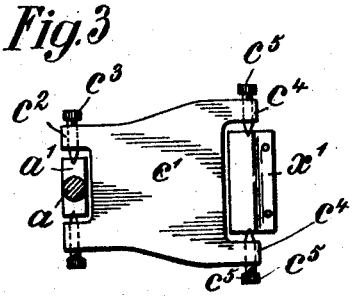
Inventor.
Otto Schmidt.
By Henry Ord
atty.

UNITED STATES PATENT OFFICE.

OTTO SCHMIDT, OF TEGEL, NEAR BERLIN, GERMANY.

WEIGHING SCALE.

1,419,766.  Specification of Letters Patent.  Patented June 13, 1922.

Application filed August 17, 1921. Serial No. 493,083.

*To all whom it may concern:*

Be it known that I, OTTO SCHMIDT, a citizen of the Republic of Germany, and a resident of Tegel, near Berlin, Germany, have invented certain new and useful Improvements in Weighing Scales (for which I have filed an application in Germany August 7, 1919, and in England August 9, 1920); and I do hereby declare the following to be a full, clear, and exact description of the invention.

The present invention relates to weighing scales in which the load is carried by a point on a horizontally pivoted lever arranged to permit the use in connection therewith of a pendulum weight of small size.

The scale pan support is maintained upright by a wide leaf spring, or equivalent device for maintaining substantial parallelism of the various positions of the support.

In the drawings, in which like parts are similarly designated—

Figure 1 is a side view with one of the side plates removed.

Fig. 2 is a plan view of the load supporting lever.

Fig. 3 is a detail, in plan, of a link for guiding the upper end of the scale pan support.

Fig. 4 is a section according to line 1—1 of Fig. 1.

The weighing scale comprises a casing 1, arched, if desired, at the top. At the bottom of the casing is a U-shaped member 2 forming the bearings $h$ for a horizontal lever $f$ having knife edges $g$ arranged to rest on the bearings $h$.

This lever $f$ is provided with a pivot pin $e$ on which rests the seat $d$ in the lower end of a rod $a$ that supports the weighing platform or pan $b$.

In the upper part of the casing is a bracket $x'$ to which is secured one end of a wide, thin leaf spring $c$, the other end of which is secured to ears $v$ one on each side of the rod $a$ and through which is passed a pivot pin 3. This spring insures the parallel guiding of rod $a$ and prevents the rod from tilting when the load is placed on one side of the pan.

The longer lever arm of the lever $f$ has an upturned perforated end $i$ and through this eye is passed a hook on one end of a link $k$. The other end of this link has a hook that engages a knife edge $l$ arranged on a pendulum $o$ eccentric to the pivot or knife edges $m$ of the pendulum. The knife edges $m$ rest in a bracket $n$.

The pendulum arm $o$ has an angle $q$ secured thereto just above the weight $p$ on its lower end. This angle rides along a curved guide $u$ and prevents the pendulum from being dislodged from the braket $n$ during transportation, and as there is but a small space between the guide $u$ and side wall of casing 1, just sufficient for the pendulum to swing in, injuries to the knife edges of the other parts will not occur.

The shorter arm of the lever $f$ carries a weight $t$ for counterbalancing the parts. Attached to the casing 1 adjacent the zero position of the weight $p$ is a buffer spring $w$.

On the end of the pendulum or weight $p$ is a pointer $r$ that rides past an arcuate scale $s$ for indicating the weights.

It is obvious that the weights may be read from a circular scale by a rotating indicator operated by any suitable driving mechanism.

The rod $a$ may be prevented from being displaced from the pin $e$ by any suitable arrangement.

In lieu of the wide, thin leaf spring $c$ I may use the arrangement shown in Fig. 3, in which a link $c'$ has ears $c^4$ at one end through which pass pivot screws $c^5$ that engage suitable recesses in the sides of the bracket $x'$. The other end of the link $k$ has similar ears $c^2$ through which pass pivot screws $c^3$ that enter recesses in a squared portion $a'$ on the rod $a$. By this arrangement the link $c$ is very easily moved and the scales become more sensitive.

The foregoing construction of scale is only operative when the load supporting rod rests on a pivot $e$ as in this case the pin $e$ takes the load at a single point, and it is immaterial whether the rod $a$ is loaded centrally or by a load put on one side of the scale pan, as the load will then be taken up always at the same point lying within a triangle between the pivots $h\ i\ h$ forming the supporting points of lever $f$, Fig. 2. This cannot be attained when the rod $a$ carries the point, and the lever $f$ the bearing for the point on the end of the rod.

I claim—

1. In a weighing scale, a horizontally pivoted lever, a pivoted weight arm, means connecting the latter with one end of said lever, a vertical scale pan rod resting on the lever between the fulcrum and the connected end of the lever, a fixed guide for the rod, and an arcuate guide for the weight arm.

2. In weighing scales, a horizontally pivoted lever having a pivot point on its top, a vertical scale pan rod resting on said point, a pendulum weight, a link connecting said weight to said lever, means near the upper end of said rod to maintain the rod vertical, an arcuate guide for the pendulum and means on the pendulum to embrace said guide to hold the pendulum in swinging position.

3. In weighing scales, a horizontally arranged lever, knife edges thereon, a pivot point on the top of said lever, a counterbalancing weight on one end of the lever and an eye on its opposite end, a vertical scale pan rod resting on said point, a thin, flat leaf spring pivoted to said rod and arranged to maintain the rod vertical, a weighted pendulum, a bracket supporting the pendulum above said lever, a link connected to the pendulum and in the eye of said lever, an arcuate guide, means on the pendulum to engage the guide, and a pointer on the pendulum.

In testimony that I claim the foregoing as my invention, I have signed my name.

OTTO SCHMIDT.